Sept. 30, 1958 J. W. PHILIPPOVIC 2,854,594

ROTARY VIBRATORY MOTOR

Filed April 12, 1955 2 Sheets-Sheet 1

INVENTOR.

JOACHIM W. PHILIPPOVIC

BY William D. Carothers

HIS ATTORNEY

Sept. 30, 1958 J. W. PHILIPPOVIC 2,854,594

ROTARY VIBRATORY MOTOR

Filed April 12, 1955 2 Sheets-Sheet 2

INVENTOR.
JOACHIM W. PHILIPPOVIC
BY William D. Carothers
HIS ATTORNEY

United States Patent Office 2,854,594
Patented Sept. 30, 1958

1

2,854,594

ROTARY VIBRATORY MOTOR

Joachim Wolfgang Philippovic, Indiana, Pa., assignor to Syntron Company, Homer City, Pa., a corporation of Delaware Application April 12, 1955, Serial No. 500,878

8 Claims. (Cl. 310—54)

This invention relates generally to vibratory motors of the rotary type and more particularly to the method and structure of bathing the rotary parts in a lubricant during operation to cool the same.

The designs of the eccentric or unbalanced-mass vibratory motors have followed the motor design. The bearings may be anti-frictional or plain bearings. If they are of large diameter to carry the dynamic loads of the weight, the circumferential speed of the bearing rollers or balls becomes unduly high, creating high bearing friction heat beyond permissible limits. If the bearings are small, as compared with the dynamic load of the weight, their load rating increases their friction and creates again heat. In view of these contradicting demands, it was up to date impossible to obtain a powerful rotary vibrator. The bearings, although lubricated, cannot dissipate the heat fast enough and thus limit the load that they can handle. The heat is dissipated only through conduction, although some motors are open to the atmosphere and employ fans but this does not entirely eliminate the heat problem. The placement of the bearings in bell ends of its motor shell creates problems of misalignment which increases the frictional heat. A lubricated bearing frequently runs dry. These and other disadvantages limit the use of eccentric or unbalanced mass rotary vibrators and particularly of the electric motor type.

The principal object of this invention is the provision of a novel oil vapor circulating system for enclosed eccentric or unbalanced mass motors to lubricate, cool the bearings, and to cool the other parts of the motor. This oil must quickly cool the motor parts and lubricate and cool the bearings.

Another object is the provision of an oil slinger to pick up and create a mist of the oil and an impeller to circulate this mist to cool the motor parts.

Another object is the provision of a tubular motor housing having annular grooves to receive expansion rings to lock the stator and bearings in position.

Another object is the provision of longitudinal slots in the bore of a tubular housing for the circulation of a coolant lubricant mist.

Another object is the provision of a tubular housing to receive and support the motor parts and bearings and which is enclosed by bell members extending over the housing ends without carrying a load, but merely functioning as an enclosure.

Other objects and advantages appear hereinafter in the following description and claims.

The accompanying drawings show for the purpose of exemplification without limiting the invention or claims thereto certain practical embodiments illustrating the principles of this invention wherein:

2

Figure 1:
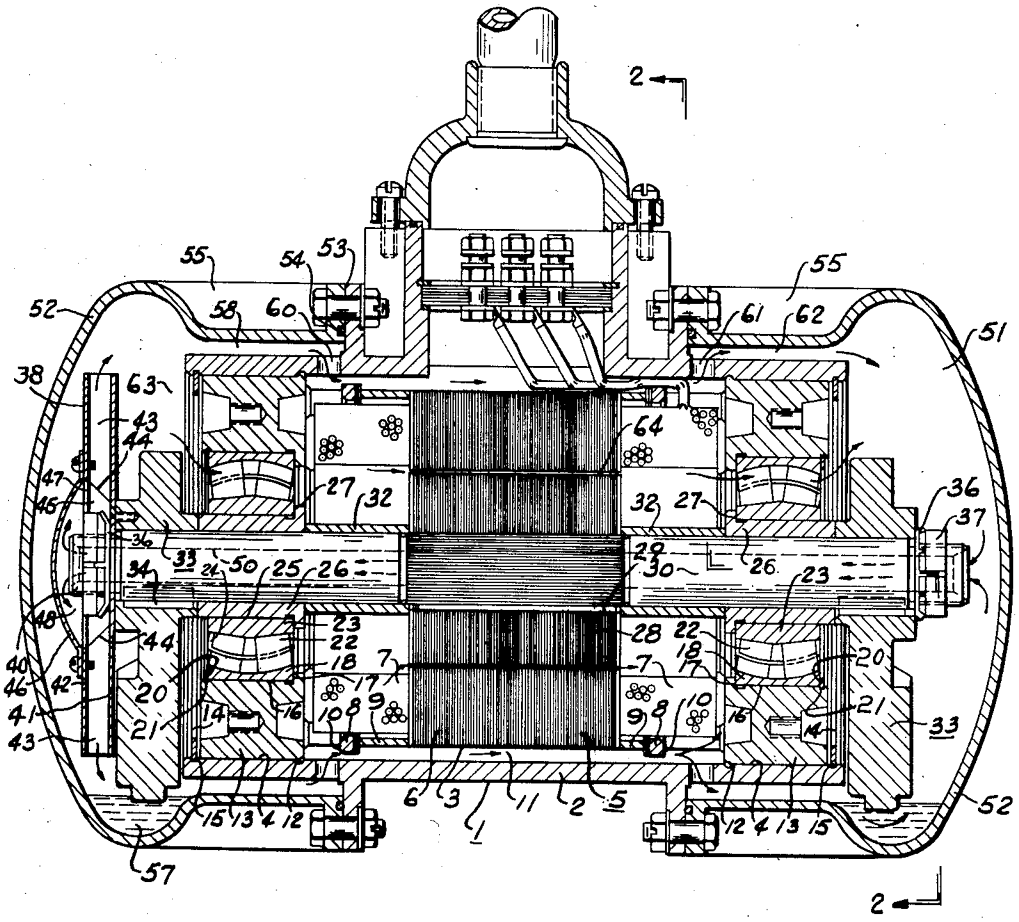
Fig. 1 is a sectional view of the rotary vibratory motor.
Figure 3:
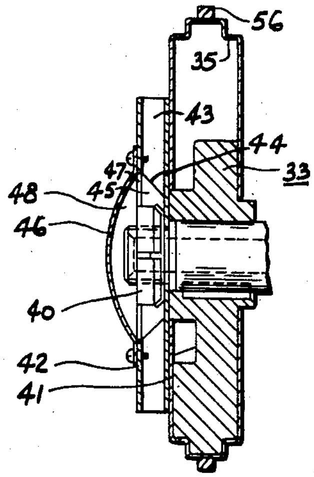
Figure 2:
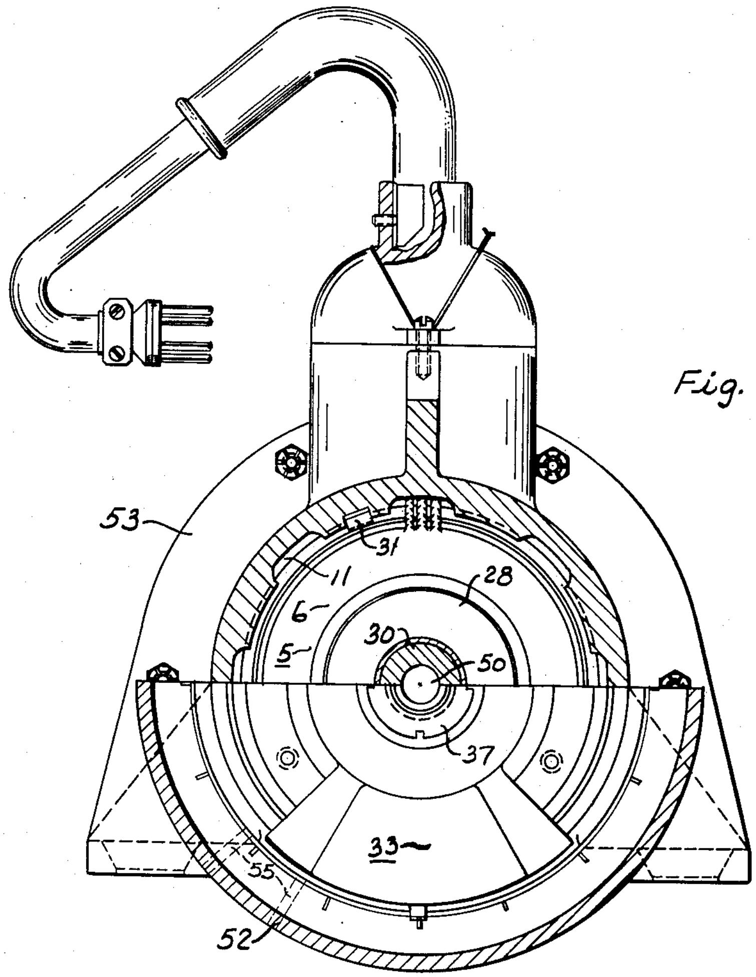
Fig. 2 is a transverse sectional view taken on the line 2—2 of Fig. 1.

Fig. 3 is a partial sectional view of a modified form of eccentric weight and covers.

Referring to the drawing, the vibratory motor 1 comprises the tubular housing 2 which is constructed of one unitary cylindrical member having an inner smaller bore 3 flanked by two larger bores 4. The smaller bore 3 has locked therein the stator 5 of the electric rotary motor which comprises the laminations 6 and the coil members 7. The laminations of the stator are compressed between the expanding snap-locking rings 8, fitting in the annular grooves to lock the laminations and spacer rings 9 between the rings 8. When the stator is positioned within the housing tube, it is hydraulically compressed until the snap rings 8 fall into place, and thus retain the laminations tight within the structure.

The bore 3 of the housing 2 is provided with a series of longitudinal slots 11 which permit the transfer of cooling fluid from one end of the motor to the other.

The outer bores 4, being larger in diameter than the inner bore 3, provide a shoulder 12 on each end of the bore 3, against which the bearing mounting block 13 is mounted, and these bearing blocks are retained by the split locking rings 14 in the slots 15.

The bearing blocks 13 are likewise provided with a bore as indicated at 16, provided with end shoulder 17 against which the outer race member 18 in the bearing abuts. This bearing race snugly fits the bore 16 and is locked in place by the annular snap rings 20 in the slots 21.

The outer race members 18 carry the roller members 22 which in turn support the inner race 23 and are held by the cage 24. The inner race 23 is mounted on the smaller diameter 25 of the sleeve 26 which provides a shoulder 27 against which the inner race abuts, the same being held in position by the smaller bearings.

The armature 28 is of the squirrel cage type and is keyed to the shaft 30 by means of the key 29. A key 31 is provided to lock the stator 5 to the housing tube 2, and to prevent it from creeping around inside the housing. The key member 29 retains the rotor member 28 on the shaft. Shaft 30 has the sleeves 32 against which the sleeves 26 are brought to hold the rotor from moving longitudinally on the shaft. Outwardly of each sleeve 26 the shaft is provided with the eccentric weight members 33 and is secured by the key 34. These eccentric weight members abut against the ends of their sleeves 26. At the right end of the shaft and beyond the eccentric weight member 33, the shaft is provided with a lock washer 36 which in turn is engaged by the nut 37 received on the end of the shaft. The other end of the shaft is provided with a similar lock washer 36. However, the nut member 40 also locks the impeller member 38, and is provided with radially extending spaced discs 41 and 42 connected by the radially extending blades 43 which form an impeller. The inner ends of the blades 43 are cut diagonally as indicated at 44 to create a vortex 45 which is enclosed by the spherical plate 46. The outer disc 42 has an inner opening 47 larger in diameter than the diagonal inner edge 44 of the blade 43. This impeller forces the fluid, in the vortex space 48, between the spherical cover 46, radially outwardly to the perimeter thereof, when the shaft is rotated.

The shaft is hollow as indicated at 50 and is open at both ends, the right end being opened into the chamber 51 formed by the bell member 52, whereas the left end of the hollow shaft is open to the vortex space 48 of the impeller 38. A duplicate bell 52 is employed to enclose the left end of the motor. Both bells are arranged to seat and seal against the shoulders 53 on the outer perimeter of the housing 2. Aside from a metalto-metal seal, these seals are provided with compression seals such as rubber seals 54 provided in grooves on the flanges of the bells 51 and 52. Between the head and the flange of each bell member, there are provided an annular series of radiating fins 55 which lie longitudinally of the motor, and aid in cooling the same.

Referring to Fig. 3, the eccentric weights 33 are paneled with an annular cover. However, the weight itself is a partial sector, and the weights at opposite ends of the vibratory motor are in place with one another. The outer perimeter of the cover 35 is provided with an oil slinger 56 which dips in the oil reservoir as indicated at 57, and throws the oil to the inner walls of the bells 51 and 52. This action turns the oil into a mist, which is then drawn by the impeller from the bell 51 at the right end of the vibratory motor through the hollow bore 50 of the shaft 30, and is forced by the impeller blades outwardly against the inner surface of the bell 52 at the left end of the motor. This oil mist being thrown against the inner surface of the bells 51 and 52, immediately transfers its heat to the same where it may be dissipated through the casing and the ribs 55. All of the oil does not return to the reservoir, but it remains in its misty form and is drawn by the suction and the pressure of the impeller, through the annular passage way 58, through the opening 60, and through the slots 11 to the openings 61 of the opposite end of the housing through the annular chamber 62 to the end of the bell where additional oil mist is picked up, and is again drawn back through the hollow shaft 50 to the impeller 38, and thus makes another complete circuit. Some of the oil mist is likewise drawn behind the eccentric weight in the spacing indicated at 63 and is drawn directly through the bearing structure and through the air gap 64 between the rotor and the stator, and through the next bearing structure, and upwardly around the oil slinger to the end of the bell where it may again re-enter the bore 50 of the tubular shaft 30. Thus the oil is picked up by the blades 56 and made in the form of a mist, circulated through the motor and the fact that it is actually a liquid, it will pick up the heat of the different parts that the oil passes in and conducts this heat to the end bells through the annular chambers 58 and 62 as well as when in contact with the outer ends of the bell. In this manner, the motor is kept very cool and the bearings are not only cooled but they are also lubricated so that they can handle a materially greater load.

I claim:

1. A vibratory motor of the rotary type comprising a tubular housing enclosing the motor stator and supporting a bearing at each end, a hollow shaft open from one end to the other and journaled in said bearings and carrying a rotor cooperating with the stator, eccentric weight means on said shaft, an impeller mounted on one end of said shaft having a vortex open to one end of the opening through said shaft to draw fluid therethrough, and an end bell closing over each end of the tubular housing and forming an oil reservoir, said eccentric weight means dipping into the oil to pick up and form a mist of the oil to permit it to be circulated in a closed path through the motor shaft and motor parts to wash the stator, rotor and bearings to lubricate and cool the same.

2. The structure of claim 1 characterized in that said impeller maintains the oil mist and recirculates the same.

3. The structure of claim 1 characterized in that the bore of the tubular housing has an annular series of longitudinal slots communicating with the ends of the motor.

4. The structure of claim 1 characterized in that said end bells extend over the ends of the tubular housing and seal on the outer surface thereof.

5. The structure of claim 1 characterized in that said bearings are antifrictional and said rotor and the inner race of said bearing are held on said hollow shaft by a nut at each end.

6. The structure of claim 1 characterized in that said tubular housing has a cylindrical bore and spaced annular grooves, and expansion rings in said grooves to hold the stator and bearings in place.

7. A rotary motor comprising a tubular housing the intermediate bore of which has a series of alternate longitudinal lands and grooves and having a mounting to dispose its axis horizontally, a motor stator supported by said lands, a bearing mounted in each end of said bore, a shaft journaled in said bearings carrying a rotor cooperating with said stator, an end bell for each end of said tubular housing in the form of a solid tubular member with an enlarged bulge adjacent its closed end to form a liquid reservoir, said end bells closing over each end of said tubular housing in spaced relation from every part of said motor and secured to the exterior of said housing intermediate the ends thereof, and means defining openings through said housing connecting said bells and said grooves.

8. A three-part rotary motor housing comprising a tubular housing part the intermediate bore of which supports a motor stator, a bearing mounted in each end of said bore, a shaft journaled in said bearings carrying a rotor cooperating with said stator, spaced annular seats on the exterior of said tubular housing part disposed inwardly of the location of said bearings, a pair of end bell parts in the form of solid tubular members each closing over the ends of the tubular housing part and the bearing at each end thereof and in spaced relation from every other part of said motor, and mounting means to secure each end bell part in sealed relation to its respective annular seat on the exterior of said tubular housing part.

References Cited in the file of this patent

UNITED STATES PATENTS

| | | |
|---|---|---|
| 2,125,645 | Money | Aug. 2, 1938 |
| 2,205,138 | Gould | June 18, 1940 |
| 2,524,269 | Patterson | Oct. 3, 1950 |
| 2,545,600 | Berry | Mar. 20, 1951 |

FOREIGN PATENTS

| | | |
|---|---|---|
| 500,924 | Germany | July 17, 1930 |
| 676,305 | Great Britain | July 23, 1952 |
| 817,475 | Germany | Dec. 29, 1952 |
| 1,032,920 | France | Apr. 1, 1953 |